US011224861B2

(12) United States Patent
Nakashima et al.

(10) Patent No.: US 11,224,861 B2
(45) Date of Patent: Jan. 18, 2022

(54) LAYERED TWC

(71) Applicant: UMICORE AG & CO. KG, Hanau-Wolfgang (DE)

(72) Inventors: Masashi Nakashima, Owasso, OK (US); John G. Nunan, Tulsa, OK (US); Ryan J. Andersen, Owasso, OK (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/895,391

(22) Filed: Jun. 8, 2020

(65) Prior Publication Data
US 2021/0379567 A1 Dec. 9, 2021

(51) Int. Cl.

| | | |
|---|---|---|
| *B01J 23/46* | (2006.01) | |
| *B01J 23/44* | (2006.01) | |
| *B01J 21/04* | (2006.01) | |
| *B01J 35/00* | (2006.01) | |
| *B01J 35/04* | (2006.01) | |
| *B01D 53/94* | (2006.01) | |
| *F01N 3/10* | (2006.01) | |
| *F01N 3/28* | (2006.01) | |

(52) U.S. Cl.
CPC .......... *B01J 23/464* (2013.01); *B01D 53/945* (2013.01); *B01D 53/9477* (2013.01); *B01J 21/04* (2013.01); *B01J 23/44* (2013.01); *B01J 35/0006* (2013.01); *B01J 35/04* (2013.01); *F01N 3/101* (2013.01); *F01N 3/2803* (2013.01); *B01D 2255/1021* (2013.01); *B01D 2255/1025* (2013.01); *B01D 2255/9025* (2013.01); *B01D 2255/9155* (2013.01); *F01N 2330/02* (2013.01); *F01N 2370/04* (2013.01); *F01N 2510/06* (2013.01)

(58) Field of Classification Search
CPC .............. B01D 53/9445; B01D 53/945; B01D 53/9468; B01D 2255/102; B01D 2258/9025; B01D 2258/014; B01J 23/40; B01J 35/0006; F01N 3/101
See application file for complete search history.

(56) References Cited

U.S. PATENT DOCUMENTS

| | | | |
|---|---|---|---|
| 8,501,661 B2* | 8/2013 | Sunada | B01D 53/945 502/325 |
| 8,794,178 B2 | 8/2014 | Mergner et al. | |
| 10,183,287 B1 | 1/2019 | Kraus et al. | |
| 2007/0264518 A1 | 11/2007 | Wolf et al. | |
| 2011/0123715 A1 | 5/2011 | Anfang et al. | |
| 2016/0158699 A1 | 6/2016 | Cavataio et al. | |
| 2017/0197179 A1 | 7/2017 | Yoshikawa | |
| 2021/0213425 A1 | 7/2021 | Nakashima et al. | |

FOREIGN PATENT DOCUMENTS

| | | |
|---|---|---|
| EP | 3 733 289 A1 | 11/2020 |
| WO | 2011/098450 A1 | 8/2011 |
| WO | 2019/055040 A1 | 3/2019 |
| WO | 2020/049107 A1 | 3/2020 |

OTHER PUBLICATIONS

DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E. V. [German National Standard], 1975. 5 pages in German (with English machine translation).

* cited by examiner

*Primary Examiner* — Timothy C Vanoy
(74) *Attorney, Agent, or Firm* — Smith, Gambrell & Russell, LLP

(57) ABSTRACT

The present invention relates to a three-way catalyst (TWC) for treatment of exhaust gases from internal combustion engines operated with a predominantly stoichiometric air/fuel ratio, so called spark ignited engines.

20 Claims, 4 Drawing Sheets

LAYERED TWC

Figure 1:
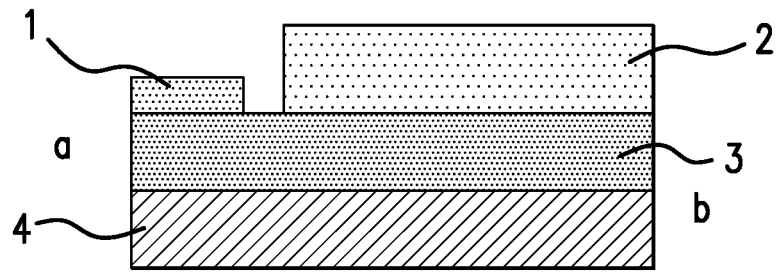

The present invention relates to a three-way catalyst (TWC) for treatment of exhaust gases from internal combustion engines operated with a predominantly stoichiometric air/fuel ratio, so called spark ignited engines.

It is well known in the field of internal combustion engines that fuel combustion is not complete and as a result gives emissions of pollutants like unburned hydrocarbons (HC), carbon monoxide (CO), nitrogen oxides (NOx) and particulate matter (PM). In order to improve air quality, emission limit legislations are in place to achieve lower emissions of pollutants from stationary applications and from mobile sources. For mobile sources like passenger cars, the implementation of active strategies such as improved combustion and optimized A/F or lambda control have been carried out in an effort to decrease the emission of pollutants. Improvement of fuel-air mixing (A/F ratio) as a primary measure yielded considerable diminution of pollutants. However, due to more stringent legislations over the years, the use of heterogeneous catalysts has been made inevitable.

For gasoline engines, so-called three-way catalysts (TWC) enable the elimination of HC, CO and NOx. Such catalysts contain catalytically active material consisting of one or more platinum group metals, in particular platinum, palladium and/or rhodium.

Maximum conversion for CO, HC and NOx by the TWC catalyst is around Lambda=1+/−0.005 where the air/fuel ratio is equal to about 14.56. Above these values, the exhaust gas is said to be lean and contains an excess of oxidants such as $O_2$ and NOx, and CO and HC are catalytically oxidized to carbon dioxide and water. Below this value, the exhaust gas is said to be rich and contains an excess of reductants such as $H_2$, CO and HCs and mainly NOx is reduced to nitrogen using e.g. CO as a reducing agent.

While maximum conversion of HC, CO and NOx is achieved at Lambda=1, gasoline engines operate under continually oscillating conditions between slightly lean and slightly rich conditions. In order to broaden the optimal operation of a TWC, oxygen storage components (OSCs) in the form of cerium-zirconium mixed oxides are included in its formulation.

Highly concentrated platinum group metals (PGMs) like platinum, palladium and rhodium, can give significant performance improvements in many exhaust after-treatment applications. Thus, in the case of palladium, the light-off (LO) performance can be improved by 100° C. (measured as temperature for 50% conversion) by increasing the Pd load from 20 g/ft$^3$ (0.7 g/l) to higher loadings of 100 g/ft$^3$ (3.5 g/l) after moderate to severe aging. Performance does improve above these loadings but the performance gradient with respect to palladium loading is low and very high palladium loads are required for an appreciable impact. The same general trend is expected for rhodium in TWC applications.

However, high concentrations of platinum group metals in three-way conversion catalysts are not favored because of their high cost. This drawback can be partially overcome by strategic placement in small size monoliths with high cell density located close to the engine manifold. This strategy takes advantage of hotter exhaust gas temperatures that shorten the time for cold start as the monolith heats faster. The lower mass coupled with high cell density takes advantage of lower thermal inertia coupled with faster heat transfer to the close coupled (CC) monolith.

A further strategy for improved light-off and for lowering platinum group metal cost is to selectively locate it on a small section of the monolith, often less than 10% of the monolith volume where it has the greatest benefit. This allows one to concentrate the platinum group metal while not using a large quantity.

It is known in the literature and previous patents that highly concentrated and short zones of PGM when applied to the substrate inlet give improved cold start performance due to improved light-off, especially for hydrocarbon (HC) and CO as high concentrations of HC and CO are emitted when the engine is cool, and incomplete combustion prevails. However, the CC monolith can be exposed to a variety of contaminants that remain in place over the lifetime of the vehicle. These include the break-down or partially combusted components in engine oil and include Ca, P, Zn and B. These poisons are not deposited uniformly over the length of the monolith. They are instead deposited preferentially towards the inlet of the catalyst and their loading drops off rapidly as one progresses towards the monolith outlet. The fall-off in loading can be exponential in nature such that the front 1-2 inches of the monolith can have very high loadings of these components. Depending on how the poisons enter the exhaust two different types of poisoning modes are observed. If the poisons leak into the vehicle combustion chamber the resultant P and Zn penetrates the washcoat (WC) and reacts with the WC components such as Ce, Al and other components. It is believed for example that P forms phosphoric acid in this poisoning mechanism and is reactive to such an extent that the normally structurally stable Ce—Zr mixed oxides are broken down to give new compounds. In extreme cases the Ce can be extracted from the Ce—Zr mixed oxides to give $CePO_4$ which results in a loss of OSC performance.

In a second mechanism the engine oil can leak directly into the exhaust after it exits the combustion cylinders. In this case the oil is deposited directly onto the monolith WC and decomposes to give zinc pyrophosphate on the surface. If high levels are deposited via this mechanism a surface "glaze" or impermeable barrier on the WC surface is established such that exhaust gas molecules are unable to diffuse to the active PGM component within the catalyst WC. This is often referred to as masking and is commonly observed for severely oil poisoned TWC catalysts.

Even though the presence of a sufficient loading of WC at the inlet of the catalyst is required for adsorption of poisons we still need a critical amount of WC for dispersion of the PGMs, for sufficient OSC and for a technology that is resistant to severe thermal aging. On the other hand, too much WC can result in increased mass transfer limitations and high thermal inertia which delays the time for catalyst light-off during the critical cold start phase on the vehicle.

The present invention addresses the problem of poisoning of the catalyst by utilizing the following concept. By producing a catalyst for the mitigation of noxious pollutants emitted from predominately stoichiometrically combusting engines comprising a carrier substrate of the length L extending between substrate ends (a) and (b) and at least three washcoat layers A, B, and C, wherein washcoat layer A comprises Rh, with optionally Pt and Pd included, and a supporting oxide and extends starting from substrate end (b) over a part of the length L, and washcoat layer C comprises one or more platinum group metals, a supporting oxide and extends over part or all of the length L, and washcoat layer B comprises Pd and a supporting oxide, and extends starting from substrate end (a) over a part of the length L, while washcoat layers A and B are coated directly onto washcoat layer C, wherein $L_A$ is the length of washcoat layer A, $L_B$ is the length of washcoat layer B, and $L_C$ is the length of washcoat layer C, and wherein washcoat layer B has a total washcoat loading of not more than 100 g/L while having a Pd content of between 0.4-20 g/L and a length $L_B$ which is not more than 40% of the length L, a catalyst is generated that surprisingly is less prone to poisoning effects than those known from prior art. The proposed solution is a catalyst architecture, in which a zoned approach is realized, where the top layer consists of a short lower WC-loaded inlet zone B with high Pd concentration followed by—in relation to zone B—a thicker WC-loaded rear Rh zone A. The bottom layer C preferably can consist of a heavier WC-loaded PGM layer as compared to the top front Pd zone B. High Pd-concentration in the low WC-loaded front top zone showed the best in performance for light-off, fast-light-off (FLO) and oxygen storage. This architecture also maintained the best performance after high phosphorous (6 g/pc) poison aging as shown in the attached FIGS. 2-4.

The present architecture of the TWC advantageously helps to mitigate the problems of its deactivation after poisoning and aging in the exhaust train of positive ignition combustion engines. The concept of said architecture is to place at least three layers of respective washcoats on one carrier substrate so as to achieve a front (a) layer B a rear (b) layer A coated onto a bottom layer C with a high Pd-content in the low washcoat-loaded layer B. According to the invention layers A and B are positioned at least partially over the layer C, the latter being advantageously coated directly onto the carrier substrate. Hence, preferably no other washcoat, e.g. pure alumina, is coated prior to the layer C onto the carrier substrate. It is further contemplated as being advantageous that layers A and B are directly coated onto layer C. Washcoat layers A and B can be coated directly attached to each other or with a gap in between. A most preferred design of the inventive layered TWC shows a gap between layers B and A and both layers are coated directly onto layer C. The skilled worker knows how to establish such a concept. e.g. in a very preferred process of coating the catalyst according to the invention a wet-on-wet-technique can be applied where at least two or all three layers are coated without a further drying and/or calcining step in between the coating steps (see U.S. Ser. No. 10/183,287B1).

As already mentioned, certain platinum group metals, like Pt, Pd and Rh are distributed within the three layers mentioned above. In a first aspect layer A comprises in any case Rh predominantly, meaning to more than 50 wt.-% based on the total PGM-content in this layer. In a preferred embodiment Rh is present to more than 80 wt.-% in layer A and very preferred is a concept in which layer A comprises only Rh as PGM. The loading of this layer A with Rh is preferably between 0.05 g/L to 4.0 g/L, preferably of from 0.1 g/L to 3.0 g/L, and most preferably as from 0.2 g/L to 2.0 g/L.

In a further aspect the layer B comprises in any case Pd predominantly, meaning to more than 50 wt.-% based on the total PGM-content in this layer. In a preferred embodiment Pd is present to more than 80 wt.-% in layer B and very preferred is a concept wherein layer B comprises only Pd as PGM. The loading of Pd in this layer is rather high compared to the total washcoat loading in this layer. Layer B advantageously comprises Pd in an amount of from 0.4 g/L to 20 g/L, very preferred between 1.0 g/L to 15 g/L and most preferred between 1.5 g/L and 10 g/L. This layer B is relatively low in washcoat load. Within the context of this invention washcoat load means the dry solid content within the slurry that is coated onto the carrier substrate comprising high surface area refractory oxides and PGMs being distributed thereon. Preferably, the washcoat loading of layer B should not exceed 100 g/L. It should preferably be between 20 g/L and 90 g/L and most preferred between 30 g/L and 65 g/L. For the other layers (A and C) the amount of washcoat both resides between 60 g/L and 350 g/L, preferably 70 g/L and 250 g/L.

The PGMs are normally distributed on a high surface area supporting oxide. Preferably, the supporting oxide is selected from the group consisting of alumina, silica, magnesia, titania, zirconia, ceria, rare earths such as lanthanum, neodymium, praseodymium, yttrium, mixtures comprising at least one of these materials and mixed oxides comprising at least one of these materials. Usually, they have a BET surface area of 30 to 250 m$^2$/g, preferably of 100 to 200 m$^2$/g (determined according to German standard DIN 66132 as of the filing date). Supporting oxides can have an OSC-activity, these materials being defined later in the text. Further supporting oxides can be used which are known to the skilled person for that purpose. Particular preferred are alumina, alumina/silica mixed oxides, magnesia/alumina mixed oxides, ceria, ceria/zirconia, rare earths such as lanthanum neodymium, praseodymium, yttrium in the form of mixed oxides (solid solutions) and zeolites. In case alumina is used, it is preferably stabilized, for example with 1 to 10 weight percent, in particular 1 to 4 weight percent, of lanthana. The different platinum group metals can be supported on the same or on different support materials. All layers A, B and C can comprise one or more of the supporting oxides as mentioned above. In layer B, however, a preferred wt.-ratio of OSC-material to alumina (OSC/$Al_2O_3$) of 0.4-0.6:0.6-0.4 relative to the total of OSC and alumina is present. In a very preferred aspect said ratio is around 1:1.

The length of the washcoat layers A, B and C can—within the limits of this invention—be designed by the skilled worker. In a preferred aspect the length of layer C ($L_C$) is 60%-100%, more preferably 70% to 100%, of the length L of the carrier substrate. Layer A can have a length $L_A$ of from 10 to 90%, preferably 20%-80% and most preferably 30%-75% of the length L. Layer B can have a length $L_B$ of from 5 to 40%, preferably 6%-35% and most preferably 7%-30% of the length L. In a very preferred aspect, the catalyst according to the invention has a washcoat layer A extending over 30 to 75% of the length L of the carrier substrate, a washcoat layer B extending over 7 to 30% of the length L of the carrier substrate and a washcoat layer C extending over 70 to 100% of the length L of the carrier substrate, preferably in direct contact with layer A and layer B. As already mentioned, the layers A and B can be coated with direct attachment to each other or with a gap in between. Especially preferred, however, is a concept within above mentioned ranges wherein L≥$L_A$+$L_B$ and wherein $L_C$ is equal to L. Most preferred is a length L>$L_A$+$L_B$ in this case.

In embodiments of the present invention, the carrier substrate of the length L can be a flow-through or a filter substrate. Such carrier substrates are usually made of cordierite, metal or fibrous material and are described in the literature and are available on the market. Preferred are flow-through substrates in this respect. In case of a wall-flow substrate plugs are present on the channel ends at each side in a checkerboard pattern which reduce to some extent the length L of the carrier. In this case L denotes the coatable length of the substrate.

The catalyst of the present invention is suitable for the treatment of exhaust gases from engines operated with a predominantly stoichiometric air/fuel ratio. In particular, it can be advantageously used in a close-coupled position, preferable as the first catalyst located directly after the exhaust manifold (so-called CC-1 position). In a preferred embodiment the catalyst of the invention is arranged in close-coupled position, which e.g. is less than 1 m, preferably less than 60 cm and most preferably less than 50 cm behind the engine outlet.

The catalyst of the present invention can be combined with another three-way catalyst, a optionally catalyzed gasoline particulate filter, a HC trap and/or a NOx trap to form a three-way catalyst system. For example, substrate end (b) of the catalyst of the present invention can be followed by a conventional three-way catalyst, eventually the latter being located on a wall-flow filter substrate. Also, substrate end (a) of the catalyst of the present invention can follow a conventional three-way catalyst, eventually the latter being located on a wall-flow filter substrate. As conventional three-way catalysts all three-way catalysts known to the skilled person and described in the literature can be used. Usually they comprise a platinum group metal, in particular palladium and rhodium, supported on a carrier material, as well as an oxygen storing component (OSC). In the context of the present invention OSC materials are preferably doped cerium-zirconium mixed oxide. Dopants are advantageously those selected from the group consisting of Pr, La, Nd, Y in an amount of less than 30 wt.-%, better less than 20 wt.-% based on the total cerium-zirconium mixed oxide which is present as a solid solution.

Likewise, a method is presented here for treatment of exhaust gases whereby the exhaust gases enter the catalyst of the invention at substrate end (a) and exiting it at substrate end (b). Hence, the exhaust gas passes over the inventive catalyst starting at end (a). Preferred is a method wherein the catalyst of the invention is arranged in close coupled position. In a further preferred method for treating the exhaust the combustion engine is a spark ignition engine. Again, this method is characterized in that the exhaust gas is passed over the catalyst of the invention, wherein it enters the catalyst at substrate end (a) and exits it at substrate end (b). Spark ignition engines are those selected from the group consisting of gasoline direct injection engines, port fueled engines, naturally aspirated gasoline engines.

The platinum metals used in slurries that are applied in layers A, B and C can be the chloride, nitrate, sulfite, acetate, ethanolamine, tetra-alkyl ammonium salts of Pt, Pd and Rh. The coating of the washcoat layer C can be done according to the skilled worker. PGM-containing washcoats for layer C are state of the art and can be chosen according to one skilled in the art, likewise. Preferred washcoats for layer C, however, comprise Pd/OSC/$Al_2O_3$ and/or Rh/OSC/$Al_2O_3$. The amount of PGM (like Pd and/or Rh) in this washcoat layer C is typically from 0.1 g/L to 20 g/L, preferably 0.2 g/L to 10 g/L. If Pd and Rh are present in layer C the weight ratio of Pd:Rh is, for example, from 20:1 to 1:10. As a preferred example for this embodiment, the carrier substrate may be coated with platinum group metal containing washcoat over the whole length L first and afterwards, e.g. after drying and/or calcining, be treated according to the present invention with layers A comprising Rh and a supporting oxide and layer B comprising Pd and a supporting oxide (FIG. 1).

The preferred method of applying washcoat layer B is using a precision piston coater, in particular as described in WO2011098450A1, where the exact length of the carrier substrate to be contacted with the Pd-comprising washcoat can be controlled as precisely as possible. Pd-washcoats are known to the skilled worker. However, preferred are those which comprise compositions selected from the group of Pd/$Al_2O_3$, Pd/OSC/$Al_2O_3$, Pd/BaO/$Al_2O_3$, Pd/BaO/OSC/$Al_2O_3$, where the OSC consists of a complex mixture and/or solid solution of cerium, zirconium and rare earth or alkaline earth oxides.

The washcoat layer A can equally be applied. The sequence (for A and B) is not important since both washcoats would have to be applied from different ends (a) or (b) of the carrier substrate. Again, the preferred method of applying washcoat layer A is using a precision piston coater like mentioned above where the exact length of the layer can be controlled as precisely as possible. Rh-washcoats for layer A are known to the skilled worker. However, preferred are those which comprise compositions selected from the group of Rh/Al2O3, Rh/OSC/Al2O3, Rh/BaO/Al2O3, Rh,Pd/BaO/OSC/Al2O3, Rh/ZrO2, Rh/ZrO2/Al2O3, Rh/OSC/ZrO2/Al2O3, Rh/BaO/ZrO2/Al2O3, Rh,Pd/BaO/OSC/ZrO2/Al2O3 where the OSC consists of a complex mixture and/or solid solution of cerium, zirconium and rare earth or alkaline earth oxides.

The layers A and B applied on the carrier substrate can overlap to a certain extend because the precision of the coating might not be accurate enough. However, it should be understood that an inevitable overlap between the layers should be as minimal as possible. As already indicated the overlap does not exceed 10% of $L_B$. In some instances, layers A and B can be coated with a gap. The gap can be between 1 mm-30 mm, preferably 5 mm-20 mm and most preferably between 5 mm-15 mm.

In a last step, drying, heating and/or calcining can occur in order to provide the ready to use substrate carrier catalyst. Preferably, each coating step as mentioned above is followed by drying and/or calcination under air and optionally thermal reduction in an atmosphere which contains forming gas. Layers A, B and C can also be coated consecutively without a drying and/or calcination step in between (see literature mentioned above). In a most preferred approach, a drying and/or calcining step is performed after coating layer C and a further drying and/or calcining step is performed only after having coated both layers A and B.

Besides three-way-catalysts, other emission control technologies may additionally be utilized not only as a uniform further layer but also in the layers A, B or C. These alternate technologies could include hydrocarbon and NOx trap washcoats and various combinations of these. Further the order in which these various technologies are applied can vary depending on the application. For example, the uniform bottom layer C could consist of a HC trap and TWC washcoat, layer A can comprise a further NOx-trap washcoat further containing Pt and layer B contains a further TWC washcoat including e.g. Rh and Pt.

In addition to using the catalyst of the present invention for the treatment of exhaust gases of engines operated with a predominantly stoichiometric air/fuel ratio, it can also be used as a diesel oxidation catalyst for the treatment of exhaust gases emitted from a lean burn engine, like diesel engines. Hence, this method also works for treating the exhaust gas of a lean-burn engine, wherein the exhaust gas is passed over an inventive catalyst and wherein it enters the catalyst at substrate end (a) and exits it at substrate end (b). When used as a diesel oxidation catalyst, the catalyst of the present invention can be combined with other components of a catalyst system for the treatment of lean burn exhaust gases. Examples of such components are active NOx storage catalysts, passive NOx storage catalysts, diesel particle filters and SCR-type catalysts.

The present invention provides a catalyst for better TWC-performance under aging and poisoning conditions. This goal was achieved by selecting a certain layered design in combination with a certain PGM distribution. It was not obvious from the prior art that this combination would result in a better mitigation of noxious pollutants like CO, HC and NOx. Therefore, the basic design components preferably comprise the following elements:

- A high Pd WC layer B in the top front layer with a lower WC-loading and a high Pd-concentration.
- The high Pd WC layer B in the top front layer has a length of preferably 1-2 inches.
- The WC in the rear layer A comprises Rh, more preferably only Rh as a PGM.
- Layer B is contacted first with the exhaust before layer A and layer C.

FIGURES

FIG. 1: Catalyst of the invention having a high Pd-loaded low WC-loaded layer (1) followed immediately by a Rh-containing layer (2) on a PGM-containing WC layer (3) on a carrier substrate (4) having ends (a) and (b).

Figures 2A, 2B:
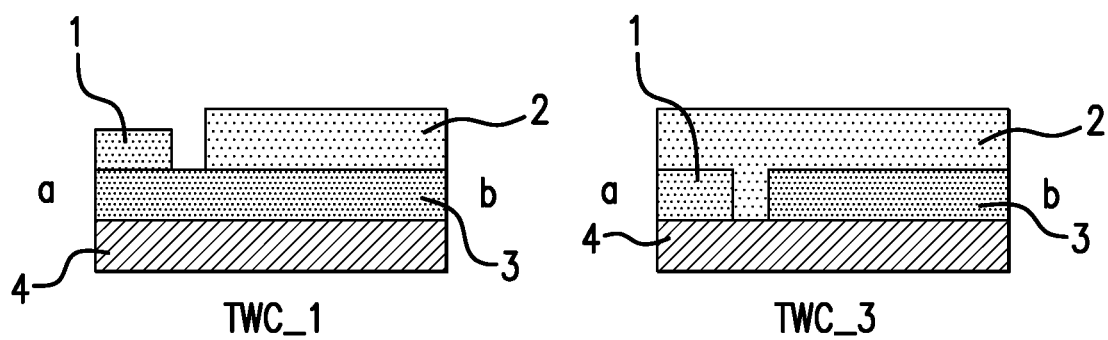
Figures 2C, 2D:
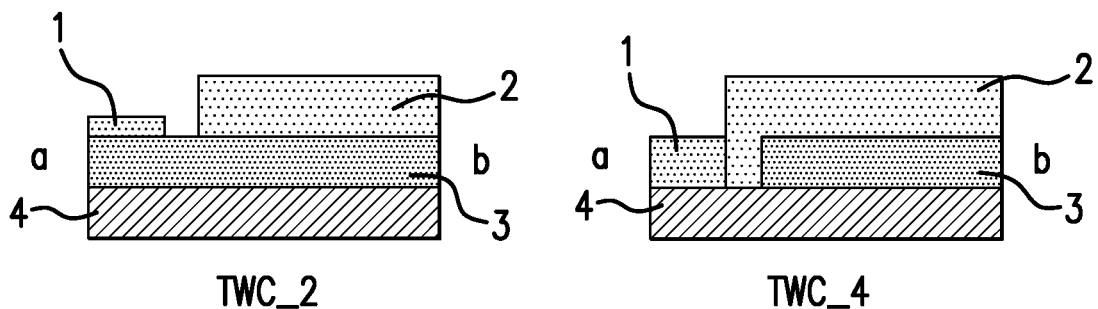

FIGS. 2a, b, c, and d: Displayed are 4 inventive catalyst concepts (TWC_1 to TWC_4) which have been tested.

Figure 3A:
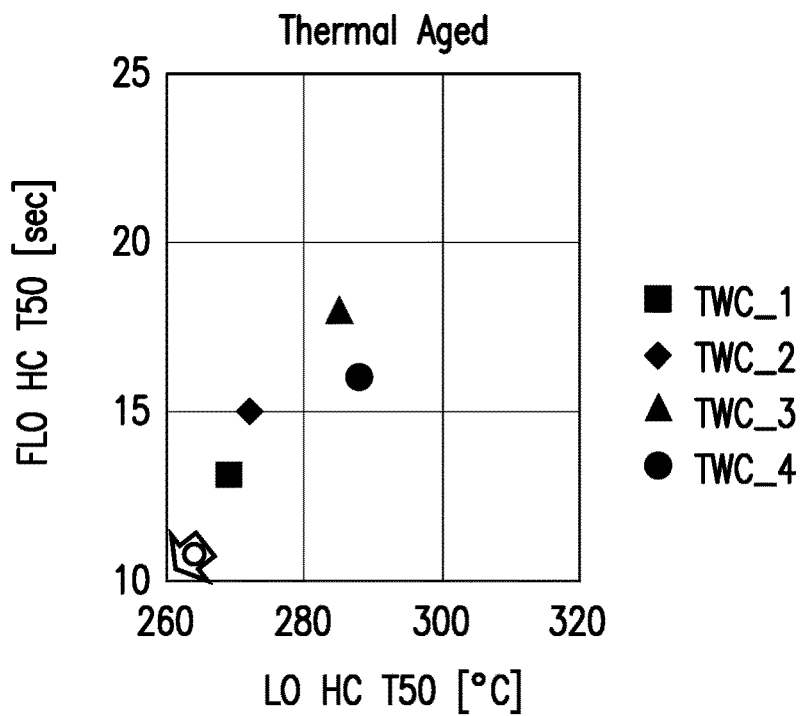
Figure 3B:
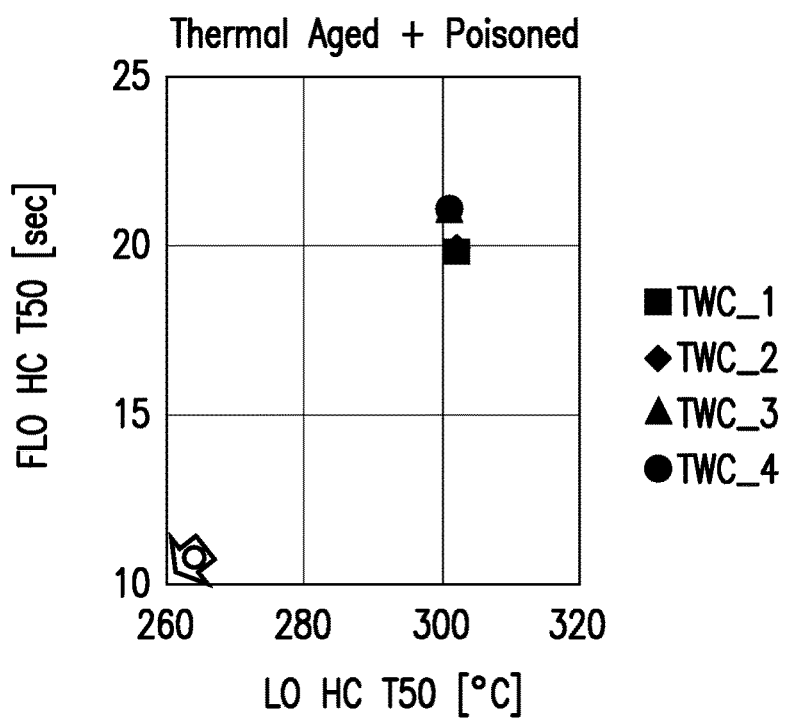
Figure 3C:
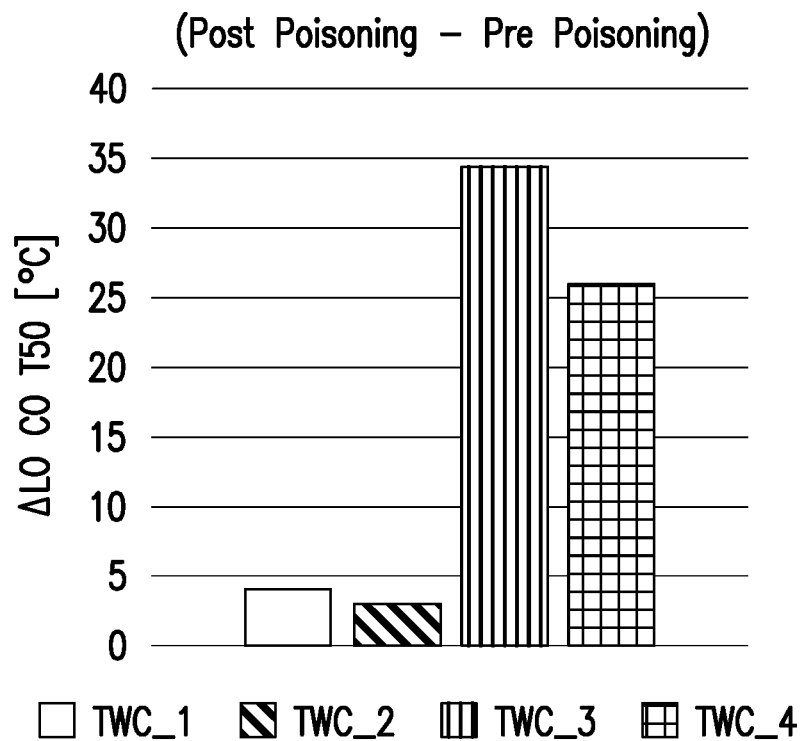

FIG. 3 a, b and c: Shows the results in light-off and fast-light-off experiments of inventive catalysts concepts TWC_1 to TWC_4.

Figure 4:
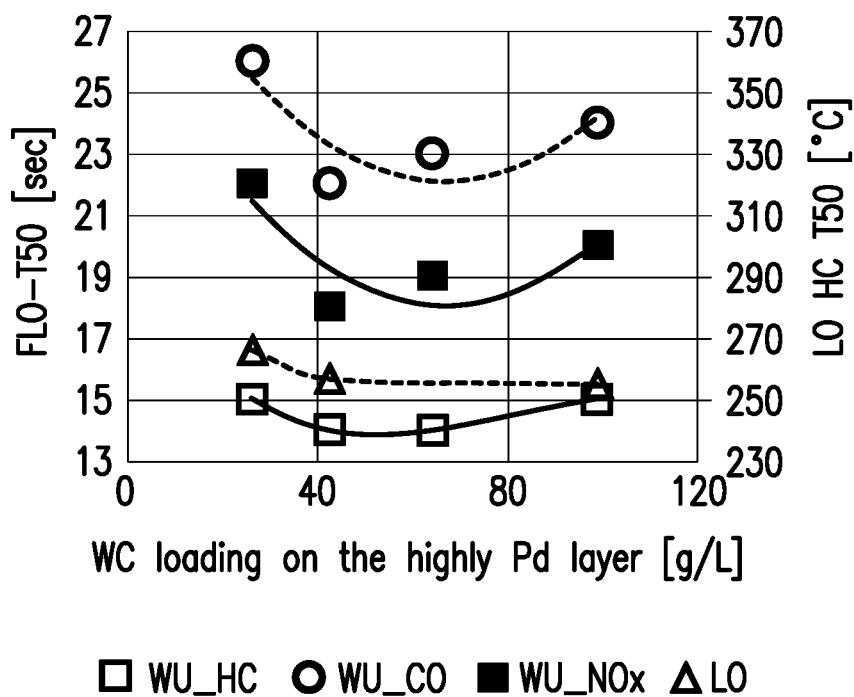

FIG. 4: Results of tests for performance in fast-light-off and light-off on changing WC-load in layer B.

Figure 5:
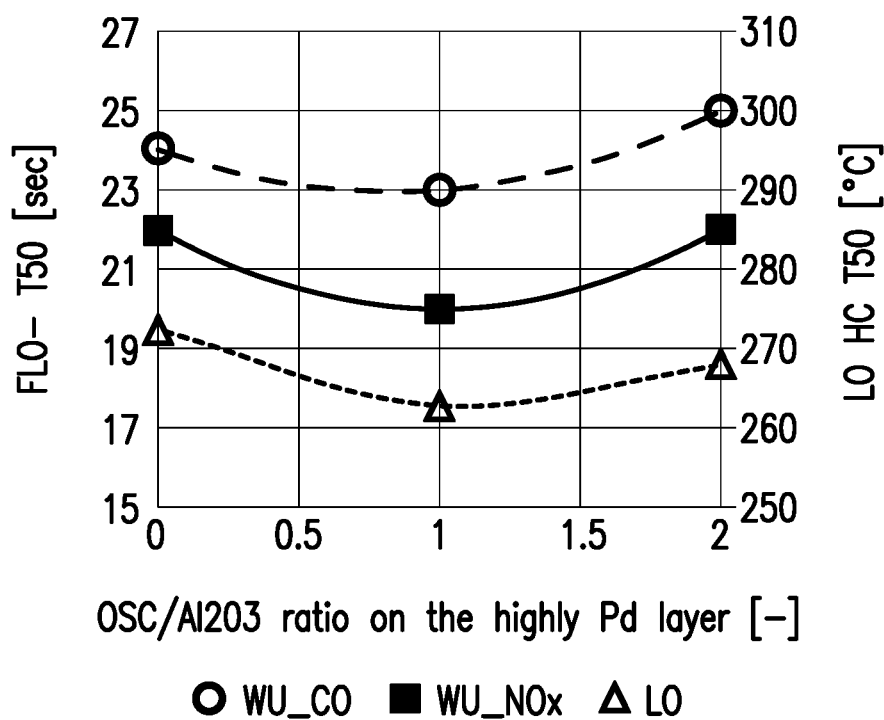

FIG. 5: Results of tests for performance in fast-light-off and light-off on changing OSC/Al2O3-ratios in layer B.

EXAMPLES

A large number of architectures and zoning studies led to the proposed WC structure and PGM placement as shown in the below FIG. 1. In this study, all samples were built using a precision piston coater and have the same total PGM. The WCs also contain the same material type and total material content. The only difference is the PGM placement and the configuration of the WC layers. TWC_3 is the reference experimental part with the a zoned washcoat layer. The four experimental parts TWC_1, TWC_2, TWC_3 and TWC_4 are drawn in FIG. 2. These four parts have the same total PGMs and similar washcoat loadings. Detailed specifications are shown in the table 1. The total Pd loading was 3.7 g/L, the total Rh loading was 0.3 g/L, and the total washcoat loading was in the range of 140-155 g/L. The substrates utilized were of identical dimensions and cell density and consisted of ceramic substrates that were φ118.4 mm×L91 mm, 600 cell/3.5 mill cell structure.

thermal inertia as shown in the FIG. 4. When the OSC/Al2O3 ratio was varied in the top-front WC layer (high Pd WC) in the above architecture, an OSC/Al2O3=1/1 was found to be the best for both FLO and LO performance as shown in the FIG. 5.

Comparison testing was carried out using TWC_1 to TWC_4.

Evaluation on Engine Dyno Bench

Four parts of TWC_1, TWC_2, TWC_3 and TWC_4 were engine aged to full useful life equivalent to 100,000 miles of road aging using a specific accelerated aging cycle. The cycle consisted of repetitive stoichiometry/fuel cut/rich phases and lasts for 50 hours. The peak temperature during air injection measured one inch from the catalyst inlet face was 965° C.

After the above aging, poison aging was carried out on the same engine using a fuel that was doped with 0.1 wt % of a phosphorous compound. The doping level was such that after 50 hours of stoichiometric aging at 700° C. the catalysts was were loaded with 6.6 g of $P_2O_5$ assuming all the phosphorous was adsorbed by the catalyst.

The aged catalysts were evaluated on a stand dyno using a 6.0 L GM engine before/after poisoning aging. The catalysts were connected to the exhaust manifold using a stainless-steel pipe. The test results are shown in FIGS. 3, 4 and 5, respectively.

The FLO testing was carried out using a 21.4 g/sec exhaust gas flow. The mean lambda of the exhaust gas was 1.000 with a lambda modulation of ±0.045 at 1 Hz. Data was collected at 1 Hz. Initially the catalyst was heated by the exhaust gas to 500° C. or close to 500° C. after which it was cooled down. During cool-down the exhaust was switched to a bypass line so that it did not pass through the catalyst. When the bed temperature of the catalyst was cooled to 50° C. the exhaust was switched from the by-pass line to the on-line position, so exhaust now passed through the catalyst resulting in the catalyst temperature increasing rapidly at a rate of 1350° C./minute in the initial 20 seconds. The time needed to reach 50% HC-conversion ($T_{50}$) was measured and compared for the four catalysts.

The LO testing was carried out using a 25 g/sec exhaust gas flow. The temperature was ramped from 135° C., inlet gas temperature to the catalyst sample to 500° C. at a rate of 51° C./minute. The mean lambda of the exhaust gas was 1.000 with a lambda modulation of ±0.045 at 1 Hz. Data was collected at 1 Hz. The inlet gas temperature needed to reach 50% HC-conversion (T50) was measured and compared for the four catalysts.

TABLE 1

|  | TWC_1 | | | TWC_2 | | | TWC_3 | | | TWC_4 | | |
| --- | --- | --- | --- | --- | --- | --- | --- | --- | --- | --- | --- | --- |
| Layer | A | B | C | A | B | C | A | B | C | A | B | C |
| Length mm | 51 | 30 | 91 | 51 | 30 | 91 | 91 | 30 | 51 | 61 | 30 | 51 |
| WC g/pc | 88 | 40 | 27 | 88 | 25 | 27 | 88 | 40 | 27 | 88 | 40 | 27 |
| Pd g/pc | 0.1 | 2.4 | 1.2 | 0.1 | 2.4 | 1.2 | 0.1 | 2.4 | 1.2 | 0.1 | 2.4 | 1.2 |
| Rh g/pc | 0.3 | 0 | 0 | 0.3 | 0 | 0 | 0.3 | 0 | 0 | 0.3 | 0 | 0 |
| Total WC g/pc | | 155 | | | 140 | | | 155 | | | 155 | |
| Total Pd g/pc | | 3.7 | | | 3.7 | | | 3.7 | | | 3.7 | |
| Total Rh g/pc | | 0.3 | | | 0.3 | | | 0.3 | | | 0.3 | |

*All tested parts had the gap between front layer and rear layer to avoid the contamination.

After several modifications of the WC loading in the front top WC-layer B, a low WC-content around 40-65 g/L gave the FLO performance and improved LO performance which probably resulted from enhanced mass-transfer and lower The results are shown in FIG. 3-a, 3-b. The catalyst having the lowest T50 number is the preferred one. FIG. 3-b shows the comparisons for the $P_2O_5$ poisoned parts. FIG. 3-a shows the comparisons after thermal aging which means before poisoning. It is observed that TWC_1 of the current invention showed the best performance as it had the lowest T50 time of FLO and the T50 temperature of LO. Even after poisoning aging it found the architecture of TWC_1 part did not have disadvantage.

The invention claimed is:

1. Catalyst for the mitigation of noxious pollutants emitted from predominately stoichiometrically combusting engines comprising a carrier substrate of the length L extending between substrate ends (a) and (b) and at least three washcoat layers A, B, and C, wherein
    washcoat layer A comprises Rh and a supporting oxide and extends starting from substrate end (b) over a part of the length L, and
    washcoat layer C comprises one or more platinum group metals, a supporting oxide and extends over part or all of the length L, and
    washcoat layer B comprises Pd and a supporting oxide of alumina, and extends starting from substrate end (a) over a part of the length L, while washcoat layers A and B are coated directly onto washcoat layer C, wherein $L_A$ is the length of washcoat layer A, $L_B$ is the length of washcoat layer B, and $L_C$ is the length of washcoat layer C, and wherein washcoat layer B has a total loading of not more than 100 g/L while having a Pd content of between 0.4-20 g/L and a length $L_B$ which is not more than 40% of the length L, and wherein washcoat layer B comprises a wt.-ratio of OSC-material to alumina of $OSC/Al_2O_3$ of 0.4-0.6:0.6-0.4 relative to the total of OSC and alumina.

2. Catalyst according to claim 1, wherein washcoat layer C is coated directly onto the carrier substrate.

3. Catalyst according to claim 1, wherein layer A comprises only Rh as PGM.

4. Catalyst according to claim 3, wherein layer A comprises Rh in an amount of from 0.05 g/L to 4.0 g/L.

5. Catalyst according to claim 1, wherein layer B comprises only Pd as the PGM.

6. Catalyst according to claim 5, wherein layer B comprises Pd in an amount of from 0.4 g/L to 20 g/L.

7. Catalyst according to claim 1, wherein the supporting oxide of layers B and C is selected from the group consisting of alumina, silica, magnesia, titania, zirconia, ceria, rare earths such as lanthanum, neodymium, praseodymium, yttrium, mixtures comprising at least one of these materials and mixed oxides comprising at least one of these materials.

8. Catalyst according to claim 1, wherein washcoat layer A extends over 30 to 75% of the length L of the carrier substrate, washcoat layer B extends over 7 to 30% of the length L of the carrier substrate and washcoat layer C extends over 70 to 100% of the length L of the carrier substrate.

9. Catalyst according to claim 1, wherein $L>L_A+L_B$ and wherein $L_C$ is equal to L.

10. Catalyst according to claim 1, wherein the carrier substrate of the length L is a flow-through or filter substrate.

11. Catalyst according to claim 1, wherein layers A and B are spaced by a gap or overlap for a length of at or less than 10% of $L_B$.

12. Catalyst according to claim 1, wherein layers A and B are directly coated onto layer C.

13. Catalyst according to claim 1, wherein the washcoat loading of layer B is 40 to 65 g/L.

14. Catalyst system comprising a first catalyst according to claim 1 and another three-way catalyst, a gasoline particulate filter, a HC trap and/or a NOx trap.

15. Catalyst system according to claim 14, wherein substrate end (b) of the first catalyst is followed by a conventional three-way catalyst.

16. Catalyst system according to claim 14, wherein substrate end (a) of the first catalyst follows a conventional three-way catalyst.

17. Method for treating exhaust gases of a combustion engine, wherein the exhaust gas is passed over the catalyst of claim 1, and wherein the exhaust gas enters the catalyst at substrate end (a) and exits the catalyst at substrate end (b).

18. Method according to claim 17, wherein the catalyst is arranged in close coupled position.

19. Method for treating the exhaust gas of a spark ignition engine,
    wherein the exhaust gas is passed over the catalyst of claim 1, and wherein the exhaust gas enters the catalyst at substrate end (a) and exits the catalyst at substrate end (b).

20. Method according to claim 19 wherein layer B is contacted by the exhaust gas before layers A and C.

* * * * *